US005633215A

United States Patent [19]
Mori

[11] Patent Number: 5,633,215
[45] Date of Patent: May 27, 1997

[54] DIELECTRIC PORCELAIN COMPOSITION HAVING A HIGH DIELECTRIC CONSTANT AND A LOW SINTERING TEMPERATURE

[75] Inventor: Toru Mori, Tokyo, Japan

[73] Assignee: NEC Corporation, Tokyo, Japan

[21] Appl. No.: 601,586

[22] Filed: Feb. 14, 1996

[30] Foreign Application Priority Data

Feb. 20, 1995 [JP] Japan ................. 7-055088
Dec. 4, 1995 [JP] Japan ................. 7-315559

[51] Int. Cl.$^6$ ............ C04B 35/46; C04B 35/472
[52] U.S. Cl. ........................... 501/136; 501/134
[58] Field of Search ............... 501/134, 136, 501/135

[56] References Cited

U.S. PATENT DOCUMENTS 4,450,240  5/1984  Miyamoto et al. ............ 501/136
4,582,814  4/1986  Thomas ........................ 501/136
4,985,381  1/1991  Mori et al. .................... 501/136

FOREIGN PATENT DOCUMENTS 3134563   6/1988  Japan ................. C04B 35/49
63-221506 9/1988  Japan .

*Primary Examiner*—Karl Group
*Attorney, Agent, or Firm*—Young & Thompson

[57] ABSTRACT

A dielectric porcelain composition includes lead magnesium tungstate ($Pb(Mg_{1/2}W_{1/2})O_3$), lead titanate ($PbTiO_3$) and lead zirconate ($PbZrO_3$) as main components at composition ratios of x, y and z respectively, wherein a point (x, y, z) in a ternary system is positioned on or within a boundary which comprises four straight line segments defined by four points of (0.725, 0.25, 0.025), (0.45, 0.525, 0.025), (0.30, 0.30, 0.40) and (0.475, 0.125, 0.40) in said ternary system as illustrated in FIG. 1, and wherein said main components are added with at least one rare earth oxide at a molar ratio in the range of 0.1–5.0 mol %.

5 Claims, 3 Drawing Sheets

DIELECTRIC PORCELAIN COMPOSITION HAVING A HIGH DIELECTRIC CONSTANT AND A LOW SINTERING TEMPERATURE

BACKGROUND OF THE INVENTION

The present invention relates to a dielectric porcelain composition for laminated ceramic capacitor, and more particularly to a dielectric porcelain composition which is sintered at a low temperature of not more than 1100° C. as well as which has a good electrostatic capacity over temperature and a high dielectric constant.

Dielectric porcelain compositions containing a barium titanate as a main component, namely barium titanate base compounds are widely used for laminated ceramic capacitors. Particularly, barium titanate base compounds are widely used as dielectric porcelain compositions for laminated ceramic capacitors which have Y5V properties (−30° C.–85° C.: ΔC/C (20° C.): +22%—82%) of EIA standard and X7R properties (−55° C.–125° C.: ΔC/C (20° C.): +15%—15%) of EIA standard. The barium titanate base compounds have a high sintering temperature of not less than 1300° C. For this reason, it is necessary to use expensive platinum or palladium for an internal electrode, resulting in a high cost of the capacitor. It has not been reported that the barium titanate base compounds may be used as dielectric porcelain compositions for laminated ceramic capacitors which have Y5U properties and Y5T properties between Y5V properties and X7R properties.

To settle the above problem with the high cost, lead based perovskite compounds have widely been studied as dielectric porcelain compositions for laminated ceramic capacitors and have been partially made practical. The lead based perovskite compounds have a low sintering temperature of not more than 1100° C. For this reason, it is possible to use silver palladium which is inexpensive for the internal electrode of the laminated ceramic capacitor. It is further possible to combine a plurality of the lead based perovskite compounds for allowing variable design choices to obtain required various properties. For example, it is possible to prepare a dielectric porcelain composition having a high dielectric constant of not less than 2000, or other dielectric porcelain compositions of X7R properties in EIA standard, which shows a small variation of the dielectric constant over temperature. The former dielectric porcelain composition may be a ternary complex system of lead based perovskite compounds, for example, lead magnesium niobate (Pb($Mg_{1/3}Nb_{2/3}$)$O_3$: PMN), lead titanate PbTiO$_3$: PT) and lead nickel niobate (Pb($Ni_{1/3}Nb_{2/3}$)$O_3$: PNN). This ternary lead based perovskite compounds is disclosed in the Japanese Laid-open Patent Application No. 48-81097. The latter dielectric porcelain compositions are disclosed in the Japanese laid-open Patent applications Nos. 58-60671, 60-42277, and 60-36371, wherein there is used a ternary complex system of lead based perovskite compounds, for example, lead magnesium tungstate (Pb($Mg_{1/2}W_{1/2}$)$O_3$: PMW), lead titanate (PbTiO$_3$: PT) and lead zirconate (PbZrO$_3$: PZ). In this system, an additive is used for improvement in the electro-static capacity over temperature.

In the Japanese laid-open Patent application No. 58-60671, there is disclosed a lead based perovskite compound showing a small variation within ±20% in capacity between different temperatures, for example, 30° C. and 85° C. However, dielectric constant of this lead based perovskite compound is not more than 5000 at a room temperature. In order to improve the capacitance properties over temperature, it is effective to add manganese compounds to the above lead based perovskite compound. The addition of the manganese compounds, however, causes a considerable reduction of the dielectric constant of the lead based perovskite compound. Another method for improving the capacitance properties over temperature is to replace partially lead contained in the lead based perovskite compound with other rear earth metals such as barium, strontium and calcium.

The Japanese laid-open patent application No. 1-298061 discloses that leads contained in the lead based perovskite compounds of the ternary complex system, for example, lead magnesium niobate (Pb($Mg_{1/3}Nb_{2/3}$)$O_3$: PMN), lead titanate (PbTiO$_3$: PT) and lead zirconate (PbZrO$_3$: PZ) are partially replaced with at least one of barium and strontium. In this case, it is difficult to use inexpensive silver palladium for an internal electrode of the capacitor since the sintering temperature is relatively high in the range of 1000° C. to 1300° C.

The Japanese laid-open patent application No. 4-115408 discloses that leads contained in the binary complex system of lead magnesium niobate (Pb($Mg_{1/3}Nb_{2/3}$)$O_3$: PMN) and other lead based perovskite compound are partially replaced with at least one of barium, strontium, calcium and silver. In this case, it is difficult to control the variation of the dielectric constant within ±20% between different temperatures of −30° C. to +85° C.

The Japanese laid-open patent application No. 63-221506 discloses that leads contained in lead magnesium tungstate (Pb($Mg_{1/2}W_{1/2}$)$O_3$: PMW), lead titanate (PbTiO$_3$: PT) and lead zirconate (PbZrO$_3$: PZ) are partially replaced with at least one of barium, strontium and calcium. Further, either magnesium oxide or zinc oxide and manganese oxide are added to ensure a relatively high dielectric constant and also satisfy B-properties of JIS standard.

As described above, in the prior art, it would be difficult to obtain a composition which has a high dielectric constant at a room temperature, wherein the high dielectric constant shows a small variation over various temperatures as well as which has a sintering temperature of not more than 1100° C.

In recent years, requirements for scaling down of and increasing capacitance of the laminated ceramic capacitor have been on the increase. To obtain the scaling down of the capacitor, it is required that each of the laminated ceramic layers constituting the capacitor has a small thickness, for example, not more than 10 micrometers. For this reason, it is required that the diameter of particles of a dielectric porcelain composition sintered would be within 2–3 micrometers.

If a lead ion-site of the lead based perovskite compound is replaced with other rare earth metals such as barium, strontium and calcium, Curie point is largely shifted to a low temperature, thereby resulting in a difficulty in material design.

SUMMARY OF THE INVENTION

Accordingly, it is an object of the present invention to provide a novel dielectric porcelain composition free from the disadvantages described above.

It is a further object of the present invention to provide a novel dielectric porcelain composition which has a high dielectric constant at a room temperature.

It is a still further object of the present invention to provide a novel dielectric porcelain composition which has a high dielectric constant showing a small variation over various temperatures.

It is yet a further object of the present invention to provide a novel dielectric porcelain composition which has a sintering temperature of not more than 1100° C.

The above and other objects, features and advantages of the present invention will be apparent from the following descriptions.

The present invention provides a dielectric porcelain composition which has main components comprising lead based perovskite compounds of ternary complex system which are added with at least a rear earth oxide, so that the dielectric porcelain composition has a high dielectric constant at a room temperature, wherein the high dielectric constant shows a small variation over various temperatures as well as the dielectric porcelain composition has a sintering temperature of not more than 1100° C.

BRIEF DESCRIPTIONS OF THE DRAWINGS

Preferred embodiments of the present invention will be described in detail with reference to the accompanying drawings.

DISCLOSURE OF THE INVENTION

The present invention provides a dielectric porcelain composition which has main components comprising lead based perovskite compounds of ternary complex system which are added with at least a one rare earth oxide, so that the dielectric porcelain composition has a high dielectric constant at a room temperature, wherein the high dielectric constant shows a small variation over various temperatures as well as the dielectric porcelain composition has a sintering temperature of not more than 1100° C.

The rare earth oxide is preferably trivalent rare earth oxide, and more preferably lead manganese niobate.

Figure 1:
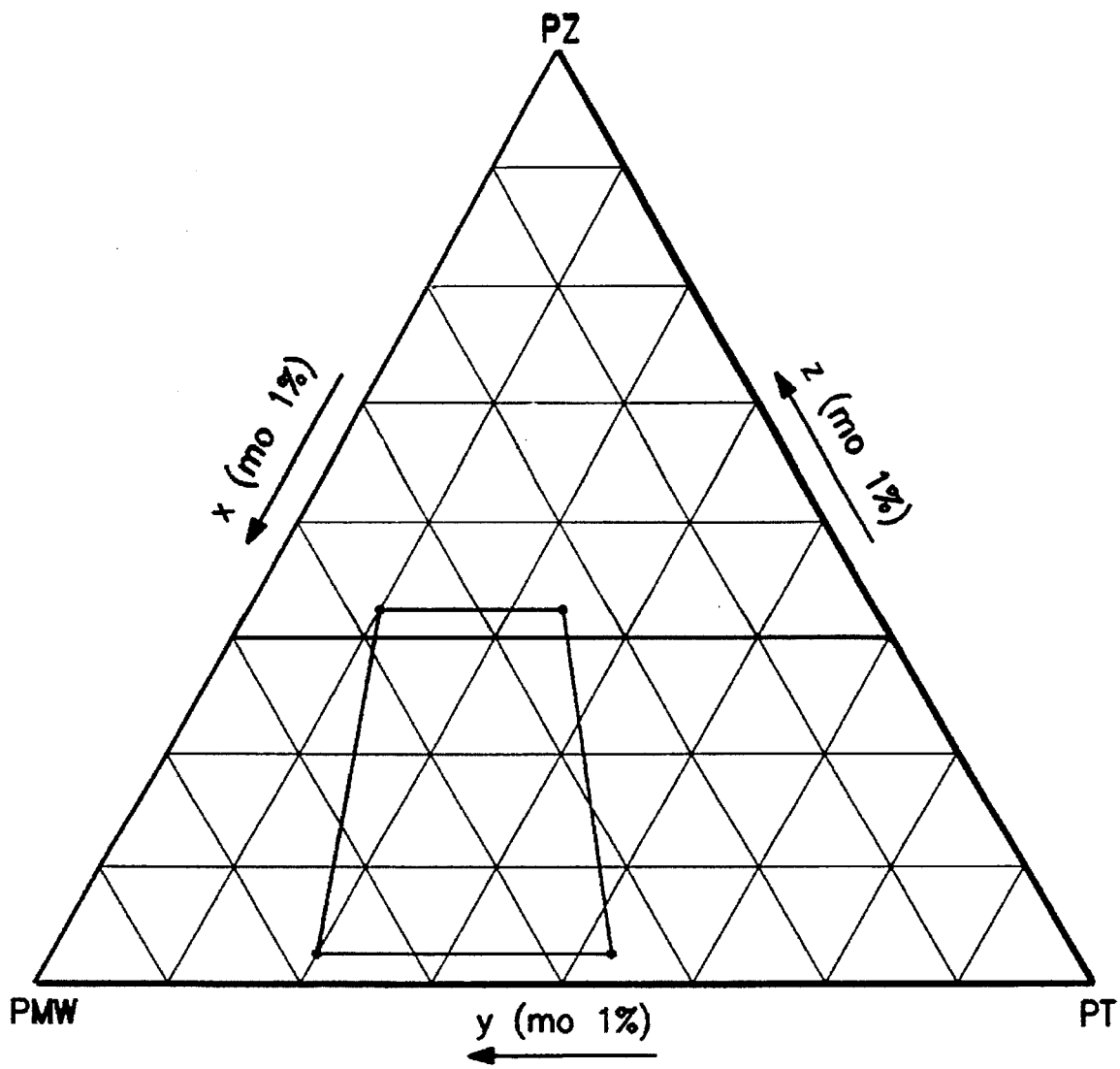
FIG. 1 is a diagram of illustrative of available composition ratios in a ternary system of lead magnesium tungstate (Pb(Mg$_{1/2}$W$_{1/2}$)O$_3$: PMW), lead titanate (PbTiO$_3$: PT) and lead zirconate (PbZrO$_3$: PZ).

According to the present invention, a novel dielectric porcelain composition includes lead magnesium tungstate (Pb(Mg$_{1/2}$W$_{1/2}$)O$_3$: PMW), lead titanate (PbTiO$_3$: PT) and lead zirconate (PbZrO$_3$: PZ) as main components at composition ratios of x, y and z respectively, wherein a pint (x, y, z) in a ternary system is positioned on or within a boundary which comprises four straight line segments defined by four points of (0.725, 0.25, 0.025), (0.45, 0.525, 0.025), (0.30, 0.30, 0.40) and (0.475, 0.125, 0.40) in said ternary system as illustrated in FIG. 1, and wherein said main components are added with at least one rear earth oxide at a molar ratio in the range of 0.1–5.0 mol %.

The above rare earth oxide may be selected from the group consisting of La$_2$O$_3$, Pr$_2$O$_3$, Nd$_2$O$_3$, Sm$_2$O$_3$, Eu$_2$O$_3$, Gd$_2$O$_3$, and Yb$_2$O$_3$.

It is preferable to further add the above dielectric porcelain composition with lead manganese niobate (Pb(Mn$_{1/3}$Nb$_{2/3}$)O$_3$: PbMnNb) at a molar ratio in the range of 0.01–5.0 mol %.

If the content of the additive, namely the rear earth oxide, is more than the above extent, the dielectric constant of the dielectric porcelain composition is unnecessarily small and further the sintering temperature is unnecessarily high. If the content of lead manganese niobate is beyond the above extent, then no improvement in the properties over temperature, unnecessarily small dielectric constant and unnecessarily high sintering temperature are obtained.

If lead manganese niobate is added to the main components of lead magnesium tungstate (Pb(Mg$_{1/2}$W$_{1/2}$)O$_3$: PMW), lead titanate (PbTiO$_3$: PT) and lead zirconate (PbZrO$_3$: PZ) at a molar ratio of at least 0.01 mol %, then a certain improvement in the properties over temperature with a high dielectric constant and a low sintering temperature are obtained. If lead manganese niobate is added excessively, then any secondary phase tends to be generated. Further, the dielectric constant is unnecessarily lowered. According to the present invention, the addition of the rear earth oxide slightly depresses the dielectric constant. An addition of lead manganese niobate as small as possible suppresses that the dielectric constant is unnecessarily lowered and also improve the properties of the dielectric porcelain composition.

The addition of the rare earth oxide such as lead manganese niobate to the complex system of lead based perovskite compounds for example, lead magnesium tungstate (Pb(Mg$_{1/2}$W$_{1/2}$)O$_3$: PMW), lead titanate (PbTiO$_3$: PT) and lead zirconate (PbZrO$_3$: PZ) causes a reduction in the maximum value of the dielectric constant and also improves the properties over temperature. In addition to the above rare earth oxide additive, lead manganese nioobate may be added to cause that a dielectric constant profile versus temperature has two peaks at high and low temperatures. This means that the dielectric constant has high levels over a relatively wide range of temperature. This also means that the property of the dielectric constant versus temperature is improved.

Difference in the rare earth oxides contained as additives results in difference in amount of shifting a Curie point of the main components. Even if the Curie point of the main components consisting of the above three lead based perovskite compounds differs from the room temperature range, it is possible to shift the Curie point within or in the vicinity of the room temperature range by adding at least a selected rare earth oxide at an optimum amount to the main components. The addition of the rear earth oxide to the main components further provides a depress effect which improves the dielectric constant property over temperature. The addition of the rare earth oxide to the lead based perovskite compounds has no ability to shift the Curie point toward the high temperature side. For this reason, if the Curie point of the lead based perovskite compounds free of any rare earth oxide additive is excessively lower than the room temperature range, it is impossible to shift the Curie point within the room temperature range even by adding the rare earth oxide to the lead based perovskite compounds. However, if the Curie point of the lead based perovskite compounds is excessively high, an excessively large content of the rare earth oxide beyond the extends described above is required to shift the Curie point within or in the vicinity of the room temperature range. The excessively large content of the rare earth oxide beyond the extends described above results in a large reduction of the dielectric constant. For this reason, it is preferable that the Curie point of the main components is in the range of approximately 0° C. to 100° C. It is also preferable that the composition ratio of lead zirconate (PbZrO$_3$: PZ) is within the range of 2.5% to 40%. If the composition ratio of lead zirconate (PbZrO$_3$: PZ) is less than 2.5%, it is difficult to improve the dielectric constant property over temperature. If the composition ratio of lead zirconate ($PbZrO_3$: PZ) is more than 40%, the dielectric constant of the main components is excessively small and the optimum sintering temperature is high.

It is available to add two or more different rare earth oxide additives to the main components.

Whereas modifications of the present invention will be apparent to a person having ordinary skill in the art, to which the invention pertains, it is to be understood that embodiments to be shown and described hereafter are by no means intended to be considered in a limiting sense. Accordingly, it is to be intended to cover by claims all modifications which fall within the spirit and scope of the invention.

EXAMPLES 1-37

Figure 2:
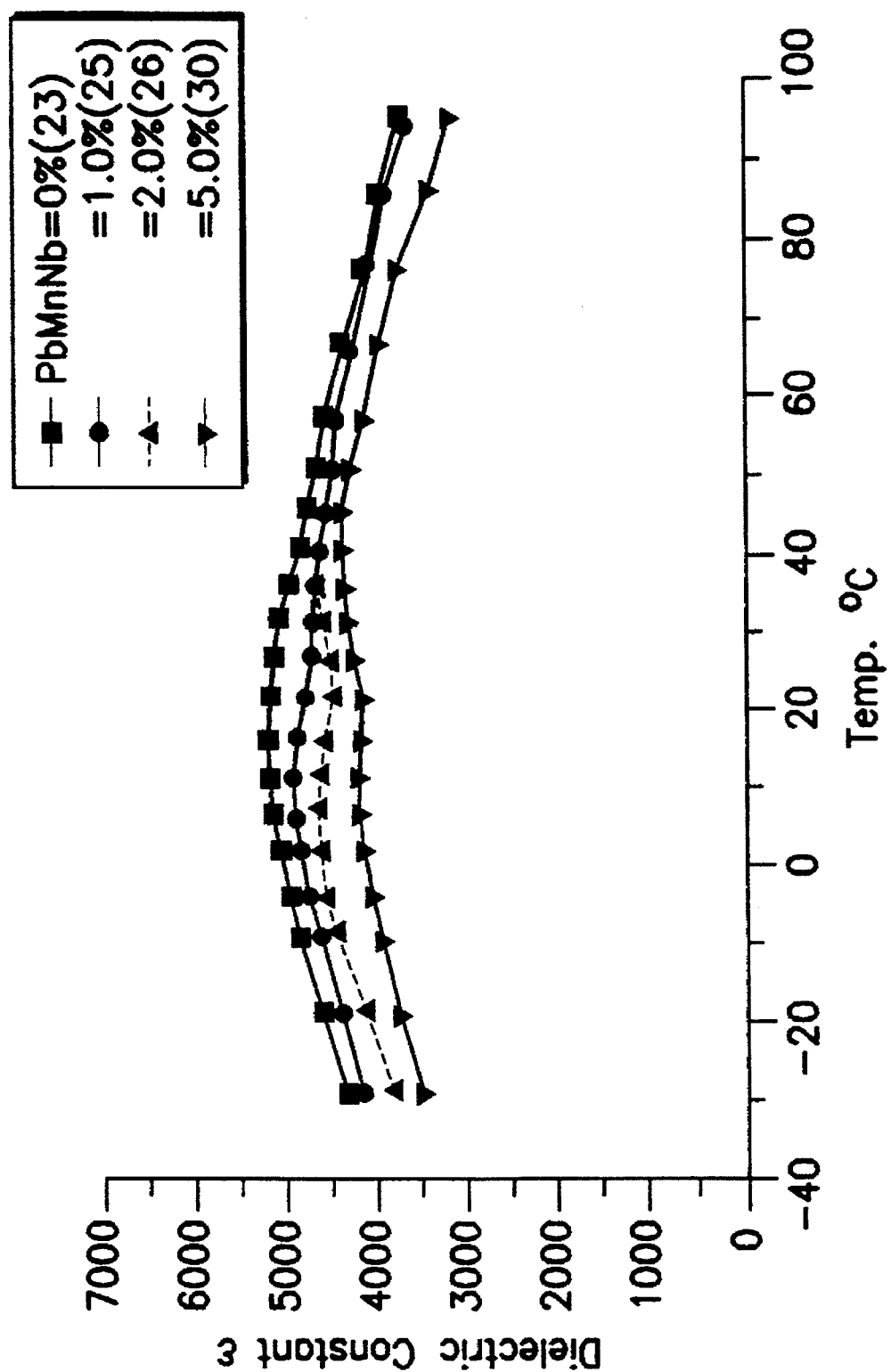
FIG. 2 is a diagram illustrative of property of dielectric constants versus temperatures of dielectric porcelain compositions in twenty third, twenty fifth, twenty sixth and thirtieth examples according to the present invention.
Figure 3:
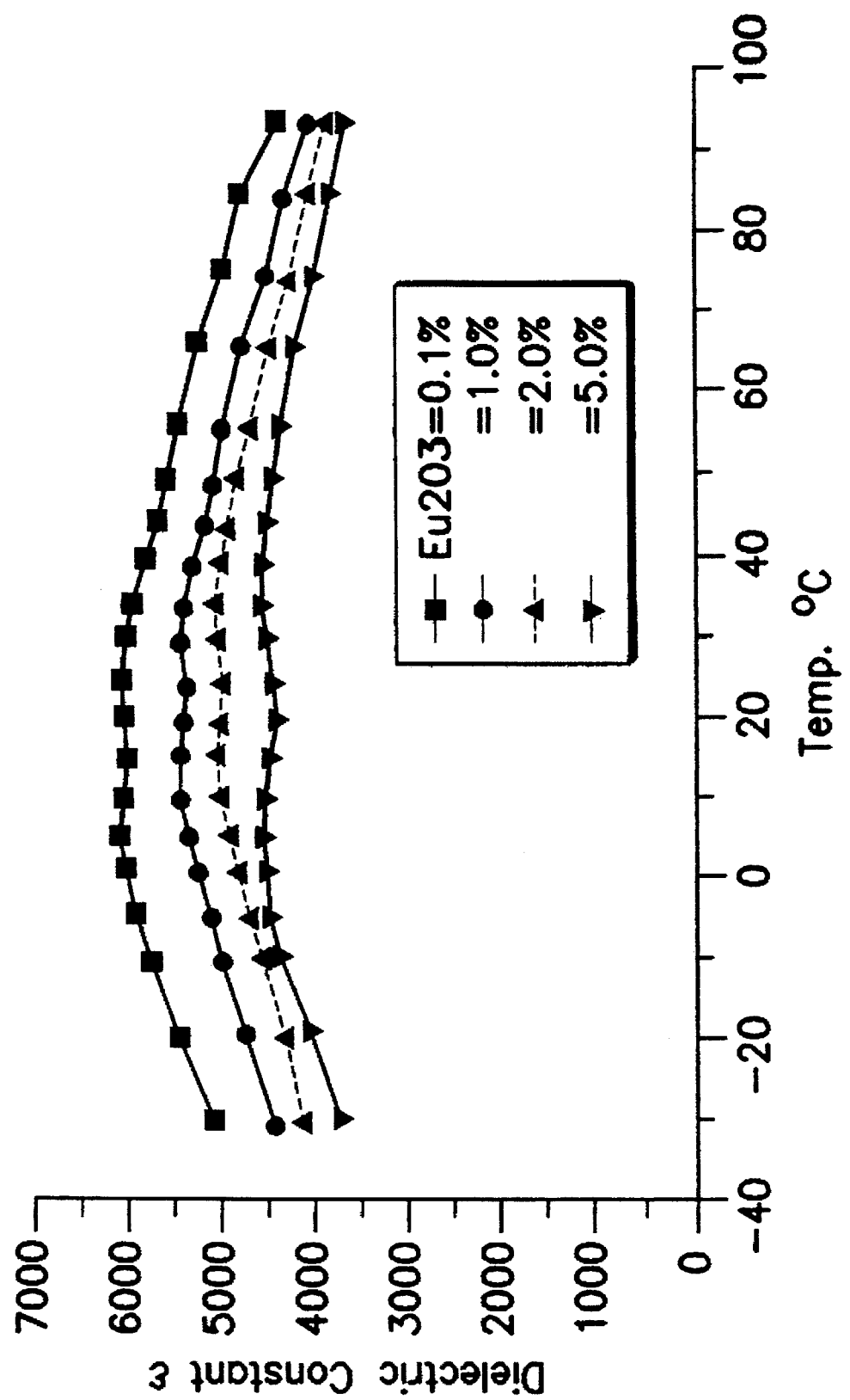
FIG. 3 is a diagram illustrative of property of dielectric constants versus temperatures of dielectric porcelain compositions in twenty sixth, twenty seventh, twenty eighth and twenty ninth examples according to the present invention.

Examples 1-37 will be described with reference to Tables 1 and 2 as well as FIGS. 2 and 3, wherein 37 kinds of dielectric porcelain compositions are prepared in Examples 1-37 respectively.

As raw materials, lead oxide (PbO), magnesium oxide (MgO), tungsten oxide ($WO_3$), titanium oxide ($TiO_2$), zirconium oxide ($ZrO_2$), raw earth oxides, manganese carbon oxides ($MnCO_3$), and niobium oxide ($Nb_2O_5$) were measured to be used at predetermined amounts in order to form compositions shown on Table 1. The above raw materials were subjected to wet mixing in a resin ball mill and then previous-sintered at a temperature in the range of 800° C. to 900° C. The sintered materials were wet-crushed in the resin ball mill and then filtered for subsequent dry process to thereby obtain powdered dielectric. The powdered dielectric was pressed to form a disc-shaped dielectric of a diameter of approximately 15 mm and a thickness of approximately 1.5 mm. The disc-shaped dielectric was then sintered at a temperature in the range of 900° C. to 1100° C. Silver paste was applied on both sides of the sintered disc-shaped dielectric and then plated thereon to form electrodes on both sides of the sintered disc-shaped dielectric to thereby forming a capacitor.

The electro-static capacitance of the capacitor was measured at temperatures −30° C., room temperature, and 85° C. Table 1 shows the compositions 1-37. Table 2 illustrates measured dielectric constants of the compositions 1-37 at room temperature, optimum sintering temperatures thereof, the rates of variations in dielectric constants at temperatures −30° C. and 85 ° C. from room temperature. The optimum sintering temperature means a temperature at which the dielectric is sintered so that the sintered dielectric at Curie point has a maximum value as compared when the dielectric is sintered at other temperature.

TABLE 1

| Composition No. | PMW x (mol %) | PT y (mol %) | PZ z (mol %) | rare earth additive (mol %) | | | | | | | PbMnNb (mol %) |
|---|---|---|---|---|---|---|---|---|---|---|---|
| | | | | $La_2O_3$ | $Pr_2O_3$ | $Nd_2O_3$ | $Sm_2O_3$ | $Eu_2O_3$ | $Gd_2O_3$ | $Yb_2O_3$ | |
| *1 | 72.5 | 25.0 | 2.5 | | | | | | | | |
| **2 | 75.0 | 22.5 | 2.5 | | | | | | | | |
| *3 | 45.0 | 52.5 | 2.5 | | | | | | | | |
| **4 | 42.5 | 55.5 | 2.5 | | | | | | | | |
| *5 | 30.0 | 30.0 | 40.0 | | | | | | | | |
| **6 | 27.5 | 32.5 | 40.0 | | | | | | | | |
| *7 | 47.5 | 12.5 | 40.0 | | | | | | | | |
| **8 | 50.0 | 10.0 | 40.0 | | | | | | | | |
| **9 | 65.0 | 34.0 | 1.0 | | | | | | | | |
| **10 | 35.0 | 17.5 | 47.5 | | | | | | | | |
| *11 | 55.0 | 35.0 | 10.0 | | | | | | | | |
| *12 | 50.0 | 25.0 | 25.0 | | | | | | | | |
| 13 | 72.5 | 25.0 | 2.5 | | | | | | | 0.2 | 0.25 |
| 14 | 72.5 | 25.0 | 2.5 | | | | | | 0.2 | | 0.25 |
| 15 | 45.0 | 52.5 | 2.5 | 2.5 | | | | | | | 1.0 |
| 16 | 45.0 | 52.5 | 2.5 | | 2.5 | | | | | | 1.0 |
| 17 | 45.0 | 52.5 | 2.5 | | | 5.0 | | | | | 2.0 |
| 18 | 30.0 | 30.0 | 40.0 | 2.5 | | | | | | | 0.25 |
| 19 | 30.0 | 30.0 | 40.0 | | 2.5 | | | | | | 0.25 |
| 20 | 30.0 | 30.0 | 40.0 | | | 5.0 | | | | | 0.5 |
| 21 | 47.5 | 12.5 | 40.0 | | | | | | | 0.1 | 0.25 |
| 22 | 47.5 | 12.5 | 40.0 | | | | | | 0.1 | | 0.25 |
| 23 | 55.0 | 35.0 | 10.0 | | | | | 4.0 | | | |
| 24 | 55.0 | 35.0 | 10.0 | | | | | 4.0 | | | 0.01 |
| 25 | 55.0 | 35.0 | 10.0 | | | | | 4.0 | | | 1.0 |
| 26 | 55.0 | 35.0 | 10.0 | | | | | 4.0 | | | 2.0 |
| 27 | 55.0 | 35.0 | 10.0 | | | | | 2.0 | | | 2.0 |
| 28 | 55.0 | 35.0 | 10.0 | | | | | 1.0 | | | 2.0 |
| 29 | 55.0 | 35.0 | 10.0 | | | | | 0.1 | | | 2.0 |
| 30 | 55.0 | 35.0 | 10.0 | | | | | 4.0 | | | 5.0 |
| 31 | 55.0 | 35.0 | 10.0 | | | | | 4.0 | | | 6.0 |
| 32 | 55.0 | 35.0 | 10.0 | | | | | | 5.0 | | 1.0 |
| 33 | 55.0 | 35.0 | 10.0 | | | | | | 5.0 | | 2.0 |
| 34 | 50.0 | 25.0 | 25.0 | | | | 1.0 | | | | |
| 35 | 50.0 | 25.0 | 25.0 | | | | 1.0 | | | | 0.5 |
| 36 | 50.0 | 25.0 | 25.0 | | | | | 1.0 | | | |
| 37 | 50.0 | 25.0 | 25.0 | | | | | 1.0 | | | 0.5 |

TABLE 2

| Composition No. | Optimal Burning Temp. °C. | Dielectric Constant ε (20° C.) | ε Rate of Change (%) −30° C. | 85° C. |
| --- | --- | --- | --- | --- |
| *1   | 950  | 4500 | −35% | −42%   |
| **2  | 950  | 4200 | −22% | −50%   |
| *3   | 1000 | 2200 | −15% | >+100% |
| **4  | 1000 | 1800 | −25% | >+100% |
| *5   | 1050 | 2600 | −31% | >+100% |
| **6  | 1100 | 1600 | −42% | +84%   |
| *7   | 1050 | 2550 | −29% | −38%   |
| **8  | 1050 | 1800 | +8%  | −41%   |
| **9  | 950  | 4850 | −22% | −37%   |
| **10 | 1150 | 2150 | −47% | −36%   |
| *11  | 1050 | 6400 | −16% | −38%   |
| *12  | 1050 | 4700 | −23% | −20%   |
| 13   | 950  | 4100 | −16% | −19%   |
| 14   | 950  | 3950 | −12% | −20%   |
| 15   | 1050 | 6600 | −18% | −10%   |
| 16   | 1050 | 6800 | −20% | −8%    |
| 17   | 1050 | 4900 | −18% | −11%   |
| 18   | 1050 | 5100 | −17% | −3%    |
| 19   | 1050 | 4800 | −11% | −6%    |
| 20   | 1100 | 3900 | −6%  | −16%   |
| 21   | 1050 | 2400 | −12% | −15%   |
| 22   | 1050 | 2300 | −9%  | −17%   |
| 23   | 1050 | 5200 | −16% | −24%   |
| 24   | 1050 | 5050 | −15% | −21%   |
| 25   | 1050 | 4800 | −12% | −19%   |
| 26   | 1050 | 4500 | −14% | −14%   |
| 27   | 1050 | 5100 | −17% | −19%   |
| 28   | 1000 | 5450 | −16% | −20%   |
| 29   | 1000 | 6100 | −15% | −22%   |
| 30   | 1100 | 4200 | −15% | −18%   |
| 31   | 1150 | 3800 | −17% | −21%   |
| 32   | 1100 | 4700 | −12% | −14%   |
| 33   | 1100 | 4350 | −9%  | −10%   |
| 34   | 1050 | 4300 | −19% | −20%   |
| 35   | 1050 | 4050 | −10% | −9%    |
| 36   | 1050 | 4450 | −22% | −21%   |
| 37   | 1050 | 4150 | −11% | −12%   |

What is claimed is:

1. A dielectric porcelain composition including lead magnesium tungstate ($Pb(Mg_{1/2}W_{1/2})O_3$), lead titanate ($PbTiO_3$) and lead zirconate ($PbZrO_3$) as main components and in relative proportions within a region bounded by four straight line segments defined by four points of (0.725, 0.25, 0.025), (0.45, 0.525, 0.025), (0.30, 0.30, 0.40) and (0.475, 0.125, 0.40) in the ternary phase diagram of FIG. 1, and wherein said main components are added with at least one rare earth oxide at a molar ratio in the range of 0.1–5.0 mol %.

2. The dielectric porcelain composition as claimed in claim 1, wherein said rare earth oxide molar ratio is in the range of 1–3 mol %.

3. The dielectric porcelain composition as claimed in claim 1, wherein said rare earth oxide is one selected from the group consisting of $La_2O_3$, $Pr_2O_3$, $Nd_2O_3$, $Sm_2O_3$, $Eu_2O_3$, $Gd_2O_3$, and $Yb_2O_3$.

4. The dielectric porcelain composition as claimed in claim 1, wherein said dielectric porcelain composition is added with lead manganese niobate ($Pb(Mn_{1/3}Nb_{2/3})O_3$) at a molar ratio in the range of 0.01–5.0 mol %.

5. The dielectric porcelain composition as claimed in claim 4, wherein said lead manganese niobate molar ratio is in the range of 1–3 mol %.

* * * * *